US007720045B2

(12) United States Patent
Bahl et al.

(10) Patent No.: US 7,720,045 B2
(45) Date of Patent: May 18, 2010

(54) METHOD TO ENABLE SIMULTANEOUS CONNECTIONS TO MULTIPLE WIRELESS NETWORKS USING A SINGLE RADIO

(75) Inventors: Paramvir Bahl, Sammamish, WA (US); Pradeep Bahl, Redmond, WA (US); Ranveer Chandra, Ithaca, NY (US)

(73) Assignee: Microsoft Corporation, Redmond, WA (US)

( * ) Notice: Subject to any disclaimer, the term of this patent is extended or adjusted under 35 U.S.C. 154(b) by 1702 days.

(21) Appl. No.: 10/428,218

(22) Filed: May 2, 2003

(65) Prior Publication Data

US 2004/0218580 A1 Nov. 4, 2004

(51) Int. Cl.
*H04J 3/06* (2006.01)
*G06F 15/16* (2006.01)
*H04L 7/00* (2006.01)

(52) U.S. Cl. .................. 370/350; 709/208; 709/209; 375/356

(58) Field of Classification Search .......... 445/426, 445/454, 509, 503, 508; 370/350, 338; 709/227
See application file for complete search history.

(56) References Cited

U.S. PATENT DOCUMENTS

| | | | | |
|---|---|---|---|---|
| 5,664,007 A | * | 9/1997 | Samadi et al. | 455/442 |
| 6,026,297 A | * | 2/2000 | Haartsen | 455/426.1 |
| 6,028,853 A | * | 2/2000 | Haartsen | 370/338 |
| 6,069,887 A | * | 5/2000 | Geiger et al. | 370/338 |
| 6,522,629 B1 | * | 2/2003 | Anderson, Sr. | 370/236 |
| 6,546,425 B1 | * | 4/2003 | Hanson et al. | 709/227 |
| 6,650,648 B1 | * | 11/2003 | Du | 370/401 |
| 6,683,865 B1 | * | 1/2004 | Garcia-Luna-Aceves et al. | 370/349 |
| 6,683,866 B1 | * | 1/2004 | Stanwood et al. | 370/350 |
| 6,865,371 B2 | * | 3/2005 | Salonidis et al. | 455/41.1 |
| 6,888,819 B1 | * | 5/2005 | Mushkin et al. | 370/350 |
| 7,126,937 B2 | * | 10/2006 | Crosbie et al. | 370/350 |
| 7,194,263 B2 | | 3/2007 | Bahl et al. | |
| 2002/0105933 A1 | * | 8/2002 | Higuchi | 370/338 |
| 2003/0236064 A1 | * | 12/2003 | Shiohara et al. | 455/1 |
| 2004/0125778 A1 | * | 7/2004 | Lin et al. | 370/338 |

* cited by examiner

*Primary Examiner*—Nick Corsaro
*Assistant Examiner*—Huy C Ho
(74) *Attorney, Agent, or Firm*—Wolf, Greenfield & Sacks, P.C.

(57) ABSTRACT

A system and method that allows a user to concurrently connect to multiple wireless networks with a single network interface card is presented. The networks may be infrastructure ("IS") networks and ad hoc ("AH") networks. A driver is inserted into a device's networking stack and exposes a plurality of virtual wireless network adapters, one for each network. The adapters are enabled and disabled in accordance with which network is presently activated. Packets for a network are queued when the network is not enabled. The wireless driver controls the switching of the network card. In one embodiment where multiple wireless cards are switching in and out of AH networks, the method converges the switching times for the cards in an AH network to ensure concurrent connectivity in the AH network for at least a brief time period every switching cycle of the wireless cards.

18 Claims, 8 Drawing Sheets

METHOD TO ENABLE SIMULTANEOUS CONNECTIONS TO MULTIPLE WIRELESS NETWORKS USING A SINGLE RADIO

FIELD OF THE INVENTION

This invention relates generally to wireless networks and, more particularly, relates to the operation of a wireless node functioning at the same time as a member of multiple disjoint wireless networks.

BACKGROUND OF THE INVENTION

With the development and deployment of wireless networking devices such as laptop computers, personal digital assistant devices, etc. and infrastructures, consumers and businesses are increasingly being able to realize the benefits of true mobile computing, collaboration, and information exchange. No longer are business travelers required to carry an assortment of cables and search endlessly for an available data port simply to connect to a network to retrieve email messages, download files, or exchange information. No longer are companies and home consumers restrained in where they may access their networks by the location of the Ethernet jacks on the wall. Meeting participants and groups of friends may now form their own ad hoc networks without connecting cables between themselves or logging in to some preexisting network. They can log onto the network using a wireless protocol while running on battery power, thereby allowing even greater mobility.

However, while the concept of mobile computing on wireless networks is well accepted, the implementation of this concept has taken on many forms. That is, there now exists several different wireless protocol standards that are competing in the marketplace. These standards include 802.11b (also know as Wi-Fi for wireless fidelity), 802.11a (also know as Wi-Fi5), 802.11g, HomeRF, Bluetooth, Wireless 1394, HiperLAN2, UWB, ZigBee, etc. Each of these different standards has particular advantages and is being developed with particular applications and users in mind. Despite the numerous standards, devices conducting network communications over wireless links are becoming increasing popular.

Wireless links typically transmit data over radio frequency channels but may operate over other carrier frequency ranges, such as infrared. Most radio frequency ("RF") based wireless networks are designed to be able to operate in two basic modes: the infrastructure mode and the peer-to-peer or ad hoc mode.

In the infrastructure ("IS") mode, which is also sometimes referred to as the managed network mode, each wireless network node communicates with the other nodes in the network through an access point ("AP") node of the IS network. The packets directed by an IS node to another IS node carry the AP's Media Access Control ("MAC") address in the link layer header. The access point functions as a bridge, repeater, gateway, and/or firewall between wireless nodes and wired nodes of the network. The access point may apportion bandwidth of the communication channel to the wireless IS nodes to ensure the quality of the communications. In the ad hoc ("AH") mode, a wireless node communicates directly, i.e., in a peer-to-peer fashion, with other nodes within its RF range without going through an intermediate node such as the access point of the IS network. Ad hoc wireless network connections are useful when close-by users want to communicate with each other in places where no IS network exists, or when they fail to be authorized by the access point of an existing IS network.

Conventionally, there is no interaction between nodes in an infrastructure network and nodes in an ad hoc network even if they have overlapping transmission ranges. There are, however, a number of scenarios in which it is desirable for a device to be connected simultaneously to multiple wireless networks. For instance, in one scenario, employees from company A conduct a business meeting at company B with an employee of company B. Company B has an internal corporate network that supports an infrastructure wireless network. The visitors need to share electronic information such as documents, presentations, and data with their host. This can be done if the visitors can use their laptop computers to communicate wirelessly with the laptop computer of company B. For security concerns, the visitors are not allowed access to company B's internal network. Thus, the laptop computers of the visitors cannot operate as nodes of company B's infrastructure network.

Currently, multiple wireless network interface cards are used in the device to connect to multiple networks. Unfortunately, using multiple wireless network interface cards in battery operated devices is highly undesirable because of the excessive energy drain and consequent reduction of device lifetime. The computer industry has recognized this problem and has developed and is developing solutions. For example, methods have been developed to conserve battery power in devices to extend the time between battery charges. Another method, developed by the assignee of the instant application, uses a dual-mode wireless device that switches back and forth between an IS network and an AH network with the switching triggered by either polls signals transmitted by an access point of the IS network or by the controller of the dual-mode wireless device.

When multiple devices are switching between networks, it is possible that two devices switching between networks get synchronized such that when one device switches to one network, the other one switches out of the network to another network. In other words, the devices are never on the same network at the same time. If the different networks are disjoint as is normally the case with IS and AH networks or multiple AH networks, the two devices will never be able to communicate with each other on the AH network because the packets they send to each other are not buffered by any third party such as an Access point for delivery to the node when it switches back to the network

BRIEF SUMMARY OF THE INVENTION

In view of the foregoing, the invention provides a system and method for devices to concurrently connect to multiple networks and be synchronized during the time in which the devices stay in an ad hoc network. A driver is inserted into a device's networking stack and exposes a plurality of virtual wireless network adapters, one for each network. The adapters are enabled and disabled in accordance with which network is presently activated. Packets for a network are queued when the network is not enabled.

In one embodiment where multiple wireless cards are switching in and out of ad hoc networks, the method converges the switching times for the cards in an ad hoc network to ensure concurrent connectivity in the ad hoc network for at least a brief time period every switching cycle of the wireless cards. A leader in each ad hoc network is determined and other wireless cards in the ad hoc network synchronize the time the cards are in the network with the leader. The leader is determined by remaining in an ad hoc network for at least two switching cycles of the wireless card to listen for announcements from other cards. If an announcement is received from another card, the MAC address of the other node is checked to determine if the other card is a leader. The synchronization with the leader comprises changing the wireless node's activity period to the leader's activity period and changing the wireless node's elapsed time to the leader's elapsed time. Media disconnect messages and media connect messages are trapped when switching between the plurality of networks.

If there is an overlap of activity periods of network leaders, the activity period of the wireless node is synchronized with one network leader based on a priority of the wireless node. The wireless node remains on the network where the other network leader is a network leader for the duration of the activity period of the other network leader. The wireless node does not send any announcement messages in the network where the other network leader is a network leader. If the current network leader abdicates its leadership role in favor of another, it synchronizes with the new leader. Other non-leader wireless nodes also synchronize with the new leader.

A switching strategy is used to switch between networks. The switching strategies include switching between the networks in accordance with an allocated activity period for each network, switching between the networks based on an amount of traffic seen in each of the networks over a period of time, and switching between the networks based on a number of packets buffered by the wireless node for the networks.

The state of other wireless nodes in each ad hoc network is maintained in a state table. The state table is checked when a packet is to be sent to a destination node to determine if the destination node is currently associated with the current network in which the wireless node is associated. If the destination node is currently associated with the current network, the packet is sent to the destination node. If the destination node is currently associated with another network, the packet is buffered. Buffered packets are sent after the state table indicates that the destination node has switched to the current network. A gateway is selected in networks to send a message if the destination of the message is not on any of the networks. A flag is set to indicate when the network with the default gateway is active.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
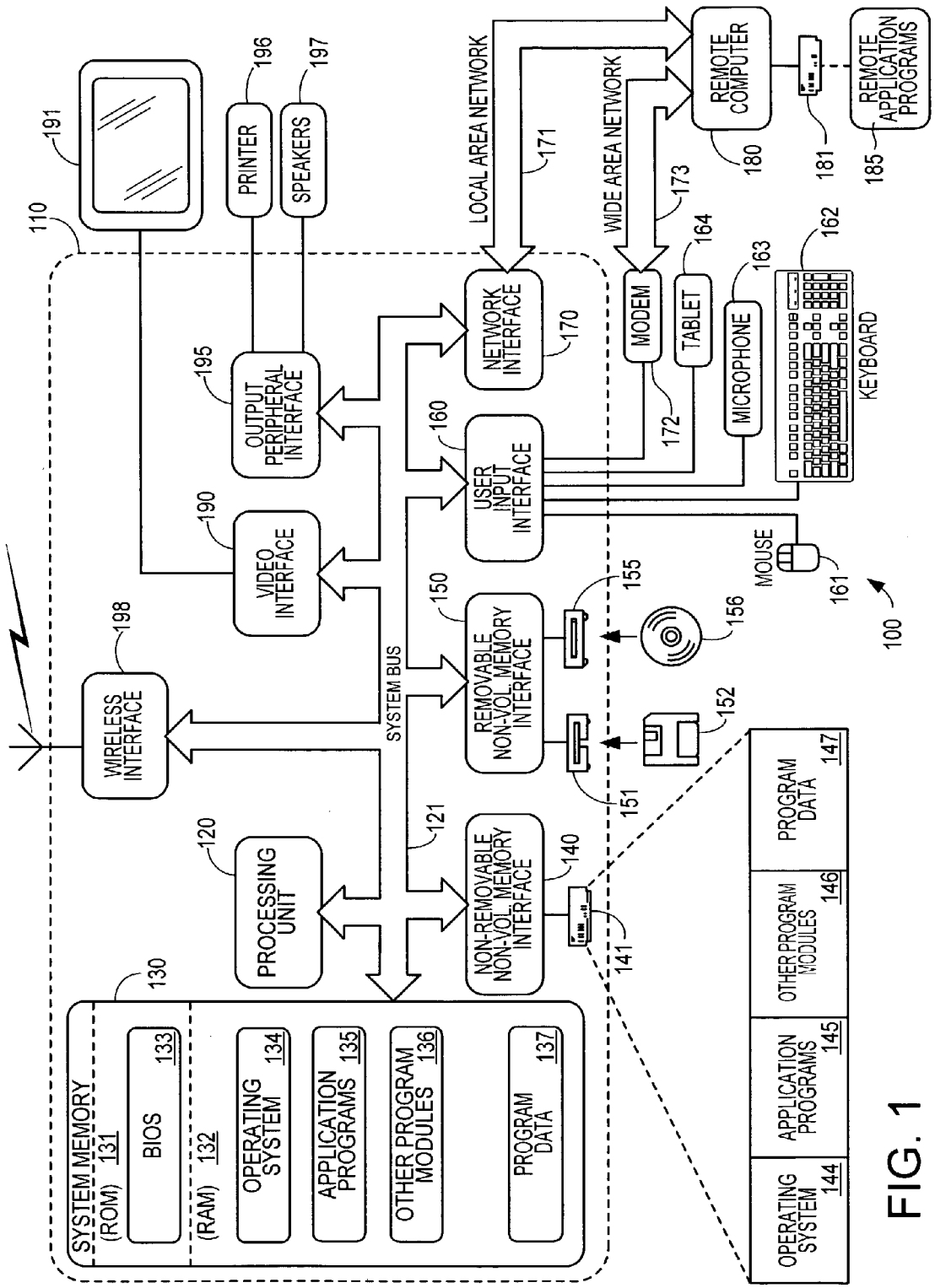
FIG. 1 is a block diagram generally illustrating an exemplary computer system on which the present invention resides.

The invention provides a method and system for switching between multiple networks using a single wireless network interface card (i.e., radio). The time during which a network interface card stays in an ad hoc network is synchronized with other cards so that an overlap exists in the time that users are connected to the ad hoc network. This ensures that users can communicate with other users in the ad hoc network.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. Computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, which can be used to store the desired information and which can be accessed by computer 110. Combinations of the any of the above should also be included within the scope of computer readable media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171, personal area network (PAN), a wide area network (WAN) 173, and a wireless link, for instance via wireless interface 198 complete with an antenna, but may also include other networks. Such networking environments are commonplace in offices, enterprise-wide computer networks, intranets and the Internet. While wireless interface 198 is shown directly connected to the system bus 121, it is recognized that the wireless interface 198 may be connected to the system bus 121 via network interface 170.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
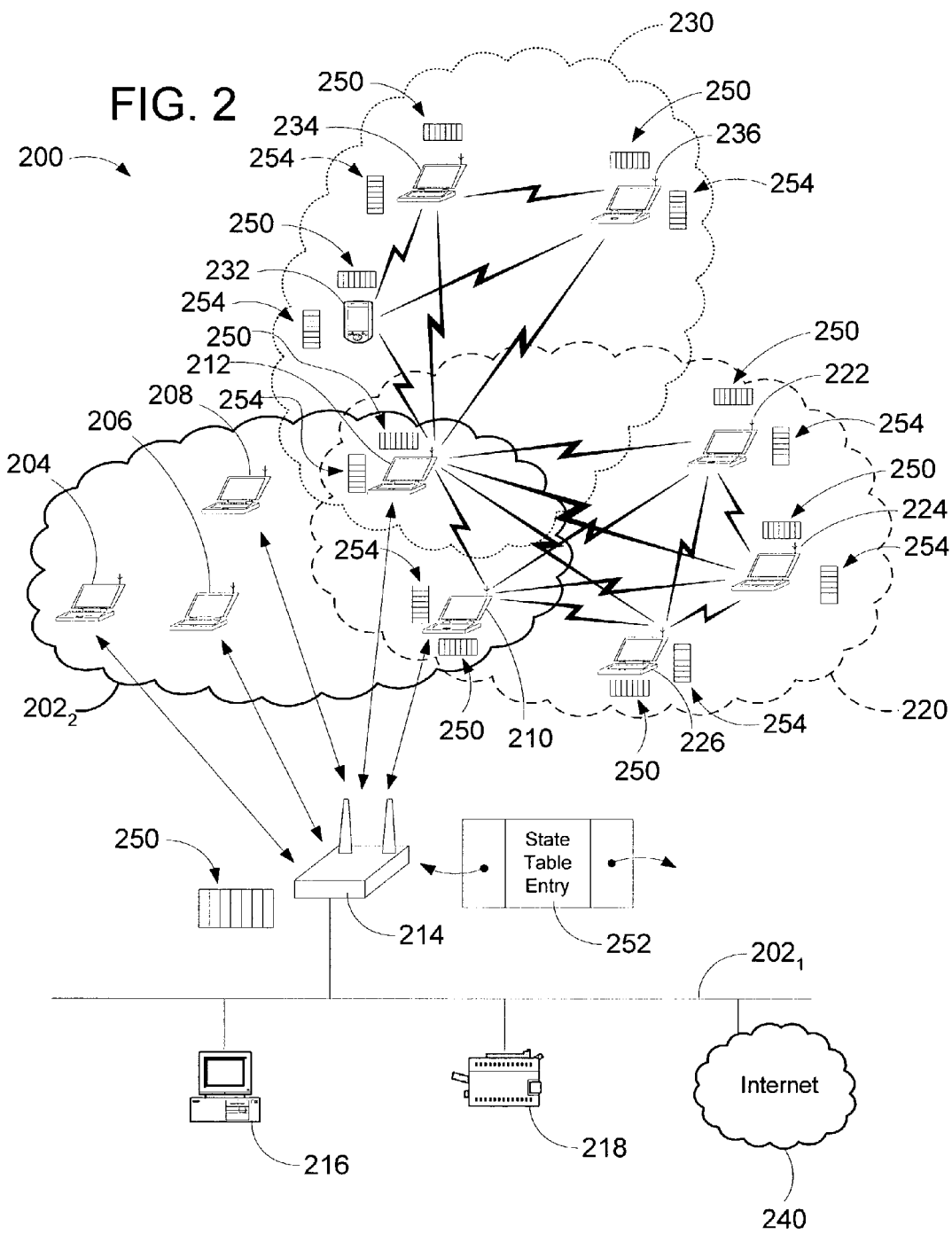
FIG. 2 is a block diagram generally illustrating an exemplary environment in which the present invention operates.

Turning now to FIG. 2, a computing environment 200 in which the invention may be used is shown. In the environment 200, an infrastructure network 202 consisting of wired portion $202_1$ and wireless portion $202_2$. Wireless portion $202_2$ has nodes 204-212 that communicate with access point 214. The access point 214 serves as an interface between the wireless portion $202_2$ and the wired portion $202_1$ of the network. Through the access point 214, the nodes 204-212 can access the wired portion $202_1$ of the infrastructure network and beyond to other connected networks such as the Internet 240 and the like. Each node has a wireless card, such as a network interface card, that communicates to other nodes via wireless interface 198.

Ad hoc network 220 has nodes 210, 212, 222, 224, and 226. Ad hoc network 230 has nodes 212, 232, 234, and 236. The nodes 204-212, 222-226, and 232-236 may be any device that communicates in a wireless medium such as IEEE 802.11, HomeRF, etc. For example, a node may be a computer 110, a PDA (personal digital assistant), a cellular phone that talks, and the like. It can be seen that node 210 is in infrastructure network 202 and ad hoc network 220. Node 212 is in infrastructure network 202, ad hoc network 220, and ad hoc network 230.

Figure 3:
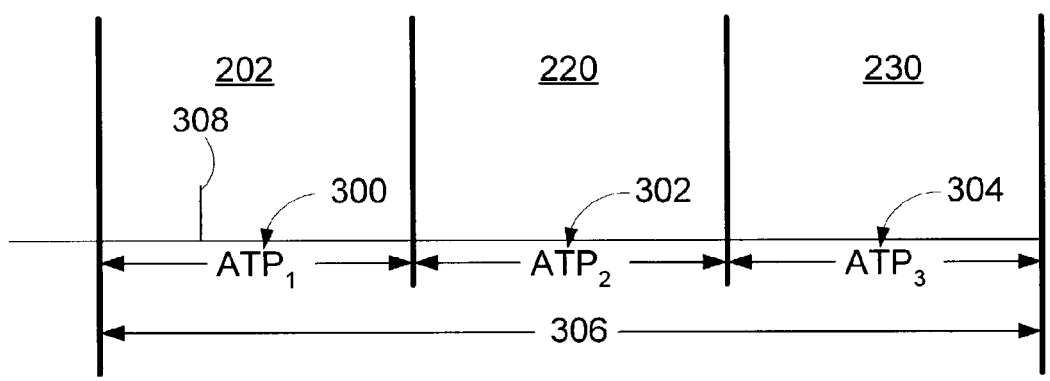
FIG. 3 is a schematic illustrating the relationship between activity period, switching cycle, and time elapsed.

In order for nodes such as node 210 and 212 to connect simultaneously to multiple networks, the invention multiplexes the wireless cards across multiple networks to achieve connectivity on all of the networks. For example, node 212 achieves connectivity on networks 202, 220, and 230 with the invention. An adaptive network hopping scheme is used. Turning now to FIG. 3, a wireless card gets a time slot, called an activity time period (ATP), for each network in which the wireless is connected. The $ATP_i$ is the time that the wireless card is connected to network i. $ATP_1$ (reference 300) is the time connected to network 202, $ATP_2$ (reference 302) is the time connected to network 220 and $ATP_3$ (reference 304) is the time connected to network 230. The sum of the activity periods over all the connected networks is called the switching cycle 306. The switching cycle 306 is the time interval for cycling through all networks the node connects to and is a fixed value. It is the aggregation of the activity time periods and switching delay ($\delta_i$), which is the time taken to switch to network i, of all the networks, along with any sleep time the wireless card may take.

Figure 4:
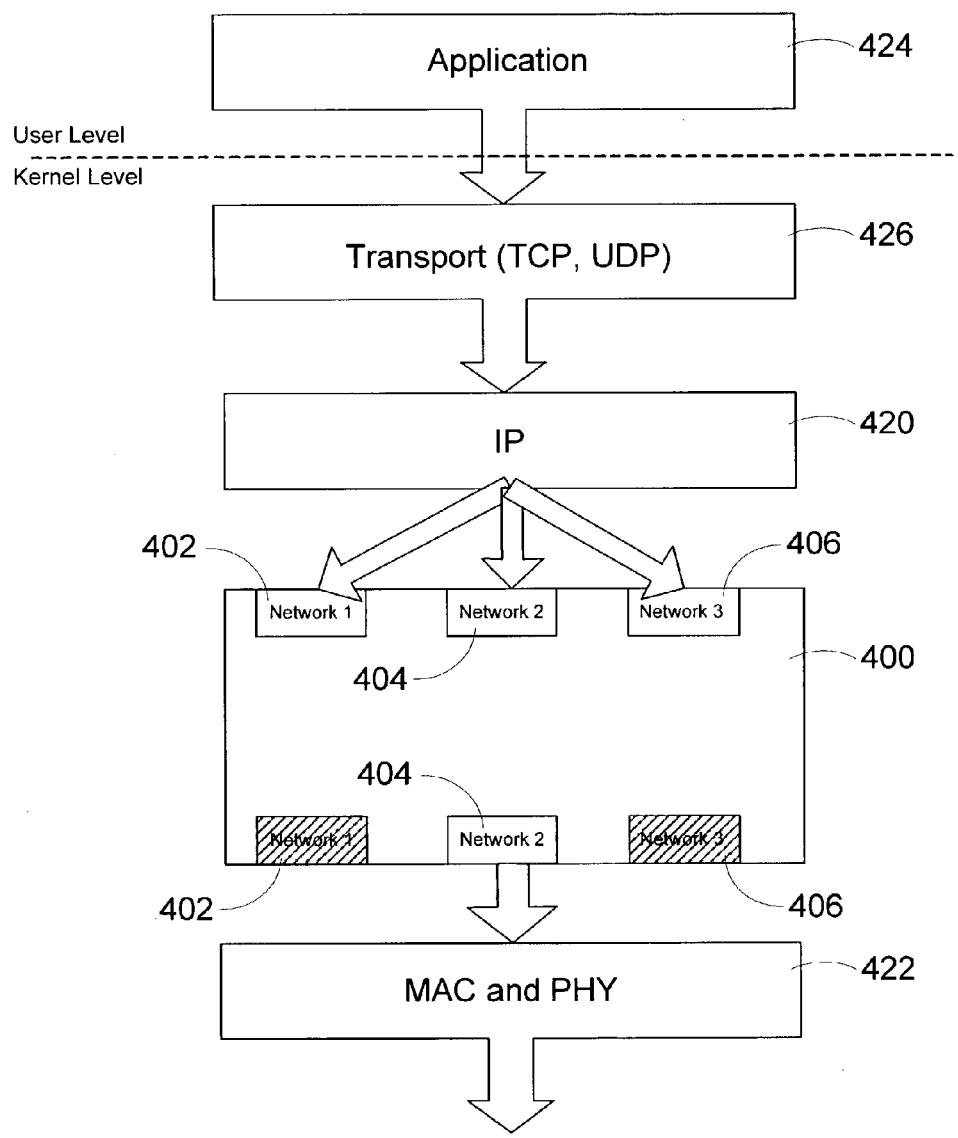
FIG. 4 is a block diagram showing an implementation of the invention in a network stack.

Turning now to FIG. 4, the network interface is virtualized to achieve transparent connectivity across multiple wireless networks. The virtualization of wireless adapters is implemented by protocol driver 400 that is placed below IP layer 420 as an intermediate layer between IP layer 420 and the MAC (Media Access Control) and PHY (Physical) layers 422. The driver 400 exposes the wireless LAN media adapter as multiple "always active" virtual wireless LAN media adapters 402, 404, 406. There is one media adapter per network to which the user wants to stay connected. The IP layer 420 sees all the media adapters, and so the networks, as always active (i.e., connected) even though at the driver level only one network is active at any given time. For example, network 1, 2, and 3 appear to the IP layer 420 as active even though network 2 is currently active at the MAC and PHY layers 422.

The protocol driver 400 is also responsible for switching the wireless card across the different networks and buffering packets for networks that are currently inactive. The upper layers (e.g., transport layer 424 and application layer 426) see the adapters 402, 404, 406 as active even though an adapter may be passive (i.e., inactive) at the driver level. The protocol driver 400 handles application sends and receives over all the connected networks using a buffering protocol as described below.

When the upper layers 424, 426 send a packet to a virtual adapter, the protocol driver 400 sends the packet down to the card if the adapter is active at the driver level. If the adapter is passive at the driver level, the protocol driver 400 buffers the packet with buffers 240 (see FIG. 2). The buffered packets are sent as soon as the corresponding virtual adapter gets activated. This protocol ensures that packets sent on a network are eventually sent to the destination. The maximum delay encountered by such a packet occurs when the packet arrives on a virtual adapter just when the corresponding virtual adapter is inactivated. In this case, the driver will have to wait for the entire switching cycle before it can send the packet. This delay for a packet on network i can be formulated as $\Sigma_{j \neq i} (T_j + \delta_j) + \delta_i$, where $T_j$ is the activity period of network j and $\delta_j$ is the time taken to switch to network j. Packets sent to a switching card over network i will be lost if the card is in a different network j at that instant. In addition to sends, the buffering protocol ensures delivery of all packets sent to a wireless card. This requires nodes to buffer packets for wireless cards that are currently unavailable, but which will become available in the near future.

Access points and nodes behave differently. Access points maintain the state of all the cards that are associated to it with a state table 252 (see FIG. 2). Nodes maintain the state of directly reachable cards in any ad hoc network to which they are connected with state table 254. The state table is a 4-tuple state space, containing information about the wireless card's address, its SSID (service set identifier), the time when the wireless card switched from this SSID, and when it is expected to switch back to this network.

The state tables are updated as follows. A card sends a packet to the access point in an infrastructure network, or to all nodes in an ad hoc network, just before switching from the infrastructure network or ad hoc network. This packet informs all the reachable nodes in the current network of its temporary unavailability. The packet also contains information about the duration of absence from the current network and is used to maintain the state table at the nodes and access points. Whenever a node or an access point has a packet to send to another node, the node or access point will first check the state table. If the destination node is currently associated to another network, the packet is buffered. When the state table indicates that the timer of a card has expired, and that it would have switched back to a network, the nodes and access points send the packets buffered for that destination on the corresponding network.

One concern for the buffering protocol is the loss of packets carrying state in the ad hoc network. This packet is broadcast and hence is prone to loss. However, switching cards in ad hoc networks send more than one packet carrying this state per switching cycle. If none of these messages get through, the node buffering packets estimates the activity period of the switching card and keeps probing it. On receiving a response, the node sends the buffered packets.

The protocol also ensures transparent switching because applications using a switching card do not have to know its state. Packets sent to the switching card are all received, though with some extra delay, as long as everybody is honest about their switching period. Note that the buffering algorithm described herein can be implemented without changing the software or hardware at the access points for infrastructure networks. The Power Saving Mode (PSM) feature available in IEEE 802.11 networks is used. The wireless cards "fake" the PSM feature by telling the access points the wireless card is entering the sleep mode when they are actually switching to another network. When a card enters PSM, the access point automatically buffers packets for that card. Although the access point thinks that the card is asleep, the card actually switches and is actively connected to other networks. After the sleep interval, the card connects to the access point and receives all the buffered packets. It should be noted that the switching cycle of the wireless card should be chosen carefully to accommodate the sleep duration on different infrastructure networks.

While the protocol described above works for multiple cards switching between infrastructure networks, it has to be enhanced to handle multiple cards switching in and out of an ad hoc network. In infrastructure networks, the access point stays on the same network all the time. This property ensures that packets transmitted from cards connected to an infrastructure network always get through, and packets to these cards are buffered at the access points if the card is currently not in that network or is sleeping. The performance of the network is affected by the buffering capability of the access point and the switching card. The situation is different for ad hoc networks. As an example, suppose user A and user B are co-workers who belong to the same organization. Further, suppose user B is sharing a presentation with user A over an ad hoc network. Both users are also connected to the corporate infrastructure network using the present invention. A worst case arises when both user A and user B switch synchronously to another network. That is, user B switches to the infrastructure network just when user A switched to the ad hoc network, and vice versa. As a result user A and user B are never in the same network at the same time. As a result, user A and user B will never be able to communicate with each other directly because there is no third party to buffer packets for delivery, whereas in an IS network there is an access point that buffers packets. The users will not be able to communicate with each other over the ad hoc network unless there is another user acting as a relay between A and B within the range of both user A and user B and whose time in the ad hoc network overlaps with the duration of both user A and user B. The switching protocol of the invention is designed to handle such scenarios without the need for another user acting as a relay between A and B.

The key to handling multiple switching devices in ad hoc networks is synchronizing the time during which devices stay in an ad hoc network. To enable devices in an ad hoc network to communicate with any other node in that network, there must exist an overlap in the time periods for which the devices stay connected to the ad hoc network. The method of the invention converges the switching times for all the switching devices in an ad hoc network. It tries to achieve synchronized switching to and from the ad hoc network for all members of that network. In the description that follows, the following variables will be used to describe the method of synchronization: $ATP_i$ (e.g., reference 300-304), $\delta_i$, switching cycle (SC, e.g., reference 306), and $TEATP_i$. $TEATP_i$ is the time elapsed inside $ATP_i$. It can be anywhere from 0 to $ATP_i$. Returning to FIG. 3, $TEATP_1$ is illustrated at 308.

Figure 5:
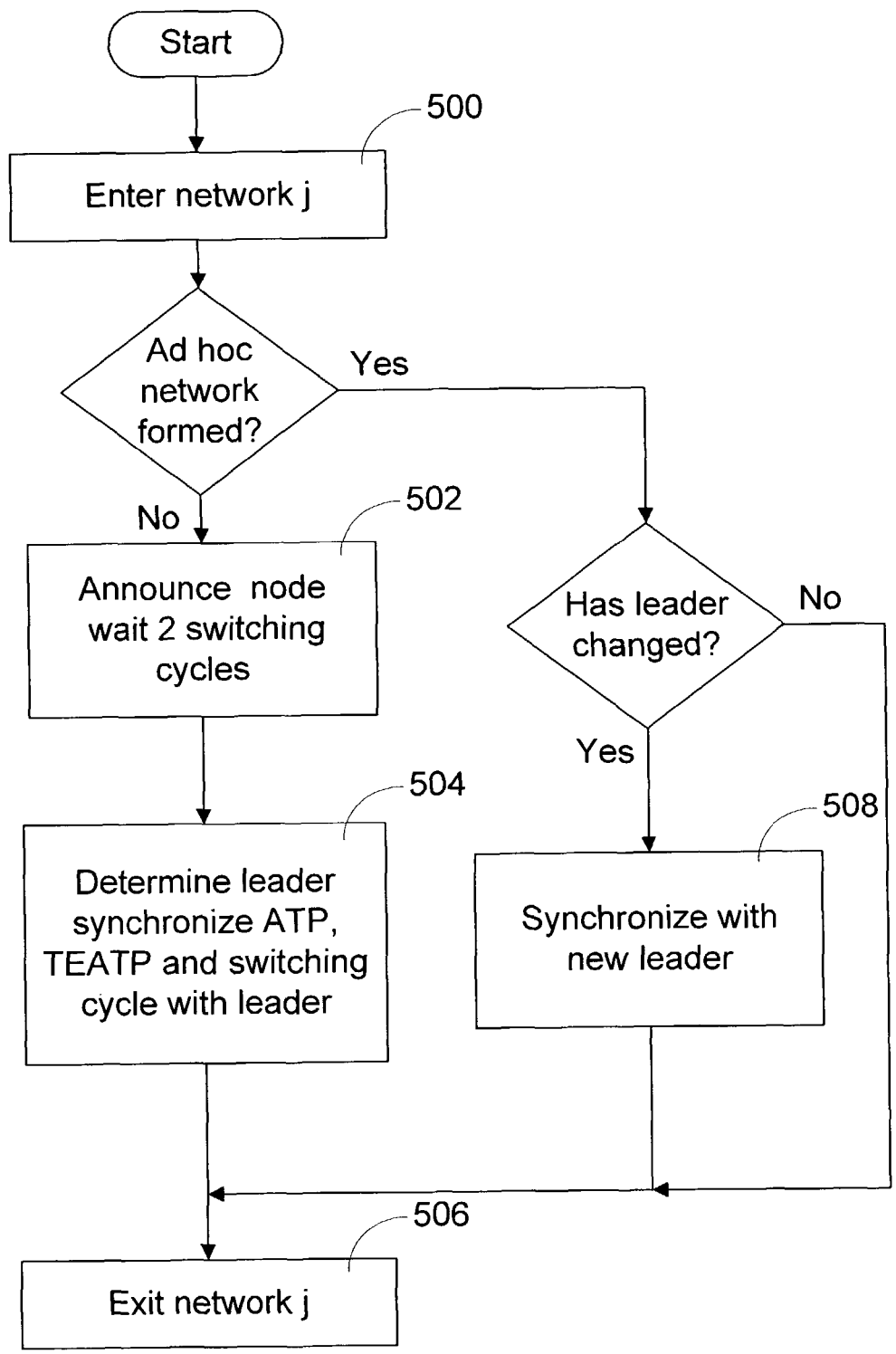
FIG. 5 is a flow chart illustrating the steps to synchronize wireless cards in a network in accordance with the teachings of the present invention.

Turning now to FIG. 5, when a node switches to a network j (step 500) where it has not yet formed an ad hoc network with any other node, it stays on the network for a time of at least 2*SC to hear announcements from other nodes in j. The node also announces itself in the beginning of this interval (step 502). Thereafter the node announces itself every SC time interval in network j. An announcement carries information about $ATP_j$ and $TEATP_j$ for the announcer. Nodes use this announcement to synchronize their time with the leader of the ad hoc group.

In one embodiment, the leader of an ad hoc network is a node with the largest MAC address in that ad hoc network. It is recognized that other ways of selecting a leader can be used. For example, a leader of an ad hoc network may be a node with the smallest MAC address or one having the highest/lowest value of another attribute such as the "time elapsed since boot" sent in the announcement. Each ad hoc network has a leader and the leader may be different in each ad hoc network. If a node hears an announcement from another node with a bigger MAC address, it marks the announcer as its leader and changes its ATP and TEATP to that of the leader (step 504). Since the node knows the SC, which is the same for all nodes, it is able to synchronize with the leader. The nodes then exit network j after the TEATP of the leader is over (step 506) and are synchronized on subsequent cycles in network j. Though a node will synchronize the start time with the leader, it may choose not to synchronize the ATP duration with the leader if it gives different priority to the network with respect to other networks it uses in the switching cycle. The node also stores the MAC address of the leader so that if the leader changes in the future, it can resynchronize itself with a new leader (or become the leader if appropriate). If the announcement is from another node with a smaller MAC address, the receiving node announces its ATP and TEATP after a random time interval in the range of 0 to WaitTime. WaitTime is less than or equal to minimum of the amount of time left to finish the network active time period (i.e. $ATP_j - TEATP_j$) of the node that triggered the announcement and the announcer. If nodes on a network stop hearing the leader for 2*SC time interval (i.e. for two full switching cycles), the nodes assume that the leader is gone and resynchronize to the next leader (step 508).

The above protocol aims at providing randomized synchronization among all the ad hoc nodes, with all the nodes synchronously switching into and out of the ad hoc network with a high probability. Moreover, in the absence of faulty nodes and when no announcement messages are lost, if the nodes in the ad hoc network j have the same $ATP_j$ value, then new nodes joining network j will converge on a single $ATP_j$ after a period of time no longer than 2*SC. This is true since a new node joining the network has to wait at most 2*SC time to hear an announcement from another node in the ad hoc network j. This node synchronizes itself with the ad hoc network in the first SC time period, and uses the remaining time to determine the value of $ATP_j$.

One area of concern is that announcement messages are broadcast and are therefore unreliable. As a result, it is possible for the announcement message to not reach all the ad hoc nodes. There might exist nodes that do not receive any announcement messages in a SC time period. Waiting for 2 times the SC time period increases the probability of a node getting synchronized with the leader in case one or more announcements is lost. Fortunately, once a node has successfully joined an ad hoc network j and assigned a value to $ATP_j$, it mainly uses the announcement messages to maintain synchronization to the ad hoc network. As a result, the loss of a few announcement messages does not drastically affect the operation of the invention.

It is possible that nodes with the largest MAC addresses in the two ad hoc networks have overlapping activity time periods. In such a case, a node should not be connected to both the ad hoc networks. Even if a node does connect to the two ad hoc networks, it may not synchronize its ATP values. There are two solutions for this problem. Firstly, the node might try to arbitrate with the leader of each ad hoc network to have non-overlapping ATPs. This solution has repercussions in terms of complexity and performance. To have non-overlapping ATPs, one or both leaders would need to adjust the start time of their ATP and the ATP duration carefully to avoid overlaps in other networks with other leaders. This solution also has a performance hit in that non-leaders would need to resynchronize. We therefore use the second solution. In this solution, the node joins both the networks, but synchronizes its ATP value to only one network based on its priority. The priority of the network could be something that is fixed or adaptive based on criteria such as the amount of traffic seen over the network over a period of time or the amount of packets buffered for it. It remains connected to the other network for the remaining duration, but does not send any announcement messages with its ATP in this network. This ensures connectivity to both the networks. However, the node should not connect to both the networks if their activity periods overlap completely.

Figure 6:
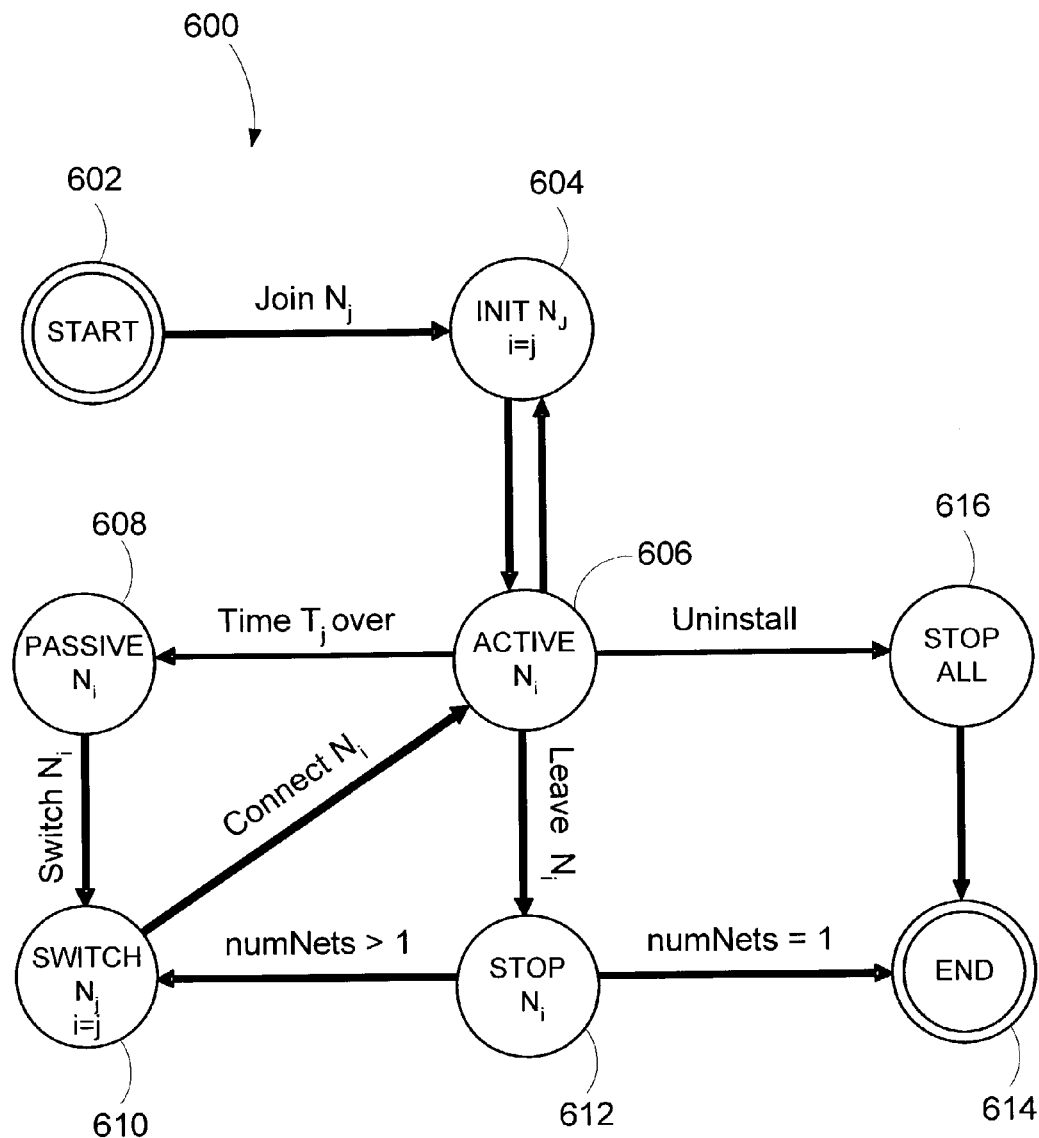
FIG. 6 is a block diagram illustrating a state diagram of a wireless node.

The working of invention is illustrated using the state diagram 600 of FIG. 6. The state diagram comprises eight states. It is assumed that the wireless card is connected to a maximum of n networks $\{N_1, N_2 \ldots N_n\}$. Let numNets denote the number of simultaneous networks to which the card is associated at a particular instant, and $T_i$ denote the activity period, $ATP_i$ (i.e. the time a card stays in a network $N_i$). Given these notations the states in FIG. 6 are explained below.

Wireless cards start in the START state 602 when they are not connected to a wireless network. Additionally, wireless cards that are not using the methods of the present invention remain in the START state 602 and traditional techniques are used to connect to the singular wireless network. These cards might be connected to at most one wireless network. A wireless card enters the INIT $N_j$ state 604 when it wants to join a new wireless network $N_j$. The card enters the INIT $N_j$ state 604 either from the START state 602 or from the ACTIVE $N_i$ state 606 as described below. After entering the INIT $N_j$ state 602, the card sets up a virtual adapter for network Nj if it does not exist. After creating the virtual adapter, the card synchronizes with other nodes if Nj is an ad hoc network as previously described. Nodes also set up the data structures for buffering and maintaining other information in this state.

In the ACTIVE $N_i$ state 606, the wireless card is connected to wireless network $N_i$. Packets sent over network $N_i$ are sent based on the buffering protocol described above. The packets to be sent over other networks are buffered to be sent when the card is connected to the other networks. After the wireless card has spent a time $T_i$ (e.g., ATP) in network $N_i$, it moves to the PASSIVE $N_i$ state 608. The network stack corresponding to $N_i$ is deactivated. Consequently, all packets sent over $N_i$ are buffered until the corresponding stack is activated later in SWITCH $N_j$ state 610. The state corresponding to $N_i$ is stored, and is used to switch back to this network during the next switching cycle.

The wireless cards enter the SWITCH $N_j$ state 610 when the current network $N_i$ is either removed in the STOP $N_i$ state 612 or the time $T_i$ has expired. In both these cases, cards use the switching strategy to determine the next wireless network, $N_j$, to connect to and the time, $T_j$, the card should stay in it. The card then connects to network $N_j$, activates the corresponding network stack and sends all the packets that were buffered on the network. The card then sets i=j and moves to the ACTIVE $N_i$ state 606.

Cards have the option of leaving a network. Cards enter the STOP $N_i$ state 612 if they want to leave a network $N_i$. All the packets for this network are canceled and the virtual adapter for this network is destroyed. If multiple networks are still being connected to (i.e. numNets>1), the card goes to the SWITCH $N_j$ state 610 and connects to the next network. Otherwise, the card goes to the END state 64.

In the END state 64, the wireless card is connected to at most one network in this state. Traditional techniques are used to connect to the singular wireless network. If the methods of the invention are to be uninstalled, the cards enter the STOP ALL state 616. The packets buffered for all the numNets networks are cancelled and the corresponding virtual adapters are destroyed. The card then moves to the END state 614.

Now that the overall operation of the invention has been described, the details of implementing the invention in a Microsoft® Windows XP® operating system will be described. It is recognized that the invention may be implemented on other operating systems. The implementation in relation to an IEEE 802.11 network shall be used to describe the implementation. Windows XP® provides a Network Driver Interface Specification (NDIS) as an intermediate layer between the network device drivers and the IP layer. NDIS provides transport independence for network card vendors since all the upper layer protocols call the NDIS interface to access the network. The invention has been implemented as a combination of an NDIS intermediate driver 740 and a service 746 (e.g., a daemon). The service 746 implements the buffering and switching logic and passes instructions to the driver 740. The driver 740 implements the mechanics for the buffering and switching. All wireless nodes should have the NDIS intermediate driver and service. However, no changes are required at the wired nodes (e.g., desktop pc 216, etc.). The access points do not require any modification if the IEEE 802.11 Power Save Mode is used as previously described. It should be noted that the method still works if other wireless nodes do not have the driver and service or if the access points do not buffer packets. However, the performance degrades significantly in these cases.

Figure 7:
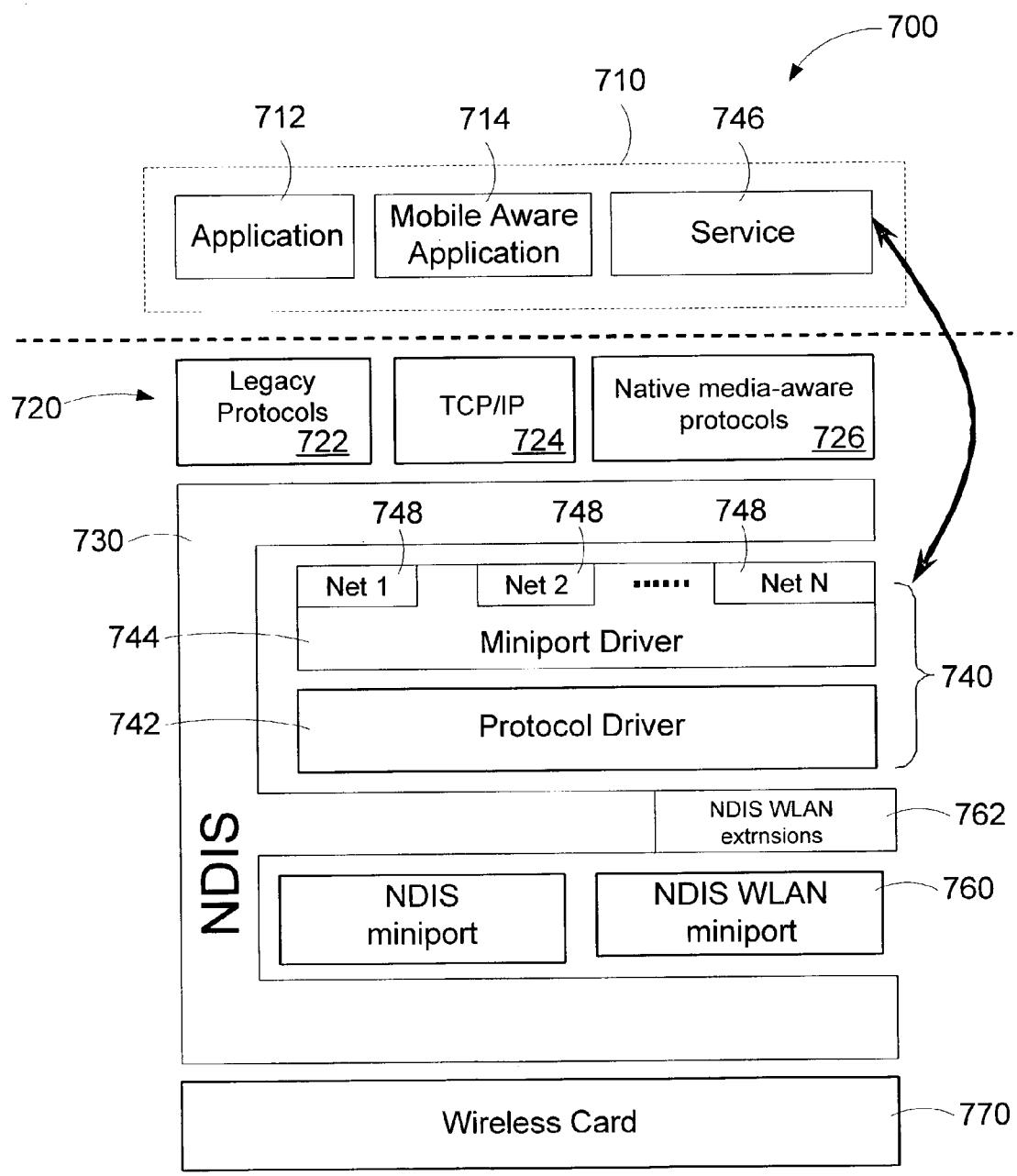
FIG. 7 is a block diagram illustrating an embodiment of the invention in a network stack.

Turning now to FIG. 7, the intermediate driver 740 is added to the NDIS compliant driver layer 730 in the networking stack 700, which is shown in a representation generally similar to the Open Systems Interface ("OSI") networking model. In the OSI model, a networking stack is represented as a set of layers, usually seven layers, such that each layer processes packets without regard to the subsequent processing by other layers. As illustrated in FIG. 7, at the top of the networking stack is the application layer 710, which includes application programs such as application 712 and a mobile-aware application 714. A mobile aware application is one that is informed of and adapts to mobility-initiated changes in the environment (e.g., address and configuration changes due to the node getting connected to a different network, the changes in the speed, latency, congestion, loss, throughput between networks, the location of the host, etc). It uses functions provided by the operating system for this purpose. The application layer 710 sends and receives packets (via intermediate layers not shown in FIG. 7) to the transport protocol layer 720, which is illustrated to have legacy protocols 722, the TCP/IP 724, and native media aware protocols 726. The protocols in the transport protocol layer 720 communicate with the NDIS compliant driver layer 730.

NDIS requires the lower edge of a network protocol driver to bind to a network miniport driver (i.e., a driver that directly manages a network interface card (NIC) and provides an interface to higher level drivers) and the upper edge of miniport drivers to bind to a protocol driver. The intermediate driver 740 comprises two components. The components are a protocol driver 742 and a miniport driver 744. The protocol driver 742 binds at the lower edge to the wireless LAN miniport driver 760 with NDIS extensions 762. The miniport driver 744 binds at the upper edge to the network protocols, such as TCP/IP 724. The protocol driver 742 exposes a virtual adapter 748 for each network to which the wireless card 770 is connected. The miniport driver 744 maintains the state for each virtual adapter 748. The advantage of this architecture is that there is an IP stack, and therefore a different IP address, for each network.

The network stack sees each virtual adapter 748 as a different wireless card interface. Each of these virtual adapters should have a distinct MAC address. Although it is possible to do this over an Ethernet interface, many commercially available wireless cards exist that do not forward packets from another MAC address. In such cases, each virtual adapter 748 is given the MAC address of the underlying wireless card. However, this is not desirable since multiple IP addresses are then assigned to the same MAC address. The protocol driver 742 manages the state of the virtual adapters 748. It switches the association of the underlying card across different networks, and buffers packets if the SSID of the associated network is different from the SSID of the sending virtual adapter 748. The protocol driver 742 also buffers packets on the instruction of the Service 746 as described hereinbelow.

The protocol driver also handles packets received by the wireless adapter. A wireless card can send and receive packets only on the currently associated network. A packet received on the wireless adapter is sent to the virtual adapter 748 that is active at that instant. The protocol driver 742 maintains the information about the currently active virtual adapter 748. The miniport driver 744 maintains all the state about each virtual adapter 748. This includes the SSID and operational mode of the wireless network. It is also responsible for handling query and set operations that were otherwise meant for the underlying wireless adapter.

In addition to the intermediate driver 740, the other major software component is the service 746. This service is implemented at the user level and implements the buffering and switching logic. It interacts with other nodes, and passes signaling messages to the intermediate driver 740 to either start or stop a switching and buffering action. The service 746 is responsible for signaling the switching time to the protocol driver 742. This signal denotes the time to switch the card and activate another network. There are various strategies that are used to determine the activity period of a network. These include fixed priority, adaptive traffic, and adaptive buffer.

In the fixed priority strategy, each network gets a fixed preallocated activity period. This time is prioritized, with some networks getting more time than the others based on the importance of the network. The priorities are specified by the user. In the adaptive traffic strategy, each network gets an activity period based on the amount of traffic it has seen over a window of time. In the adaptive buffer strategy, the networks get an activity period proportional to the number of packets buffered by the intermediate driver 740. The benefits of each approach are described below.

The service 746 on the switching node broadcasts a message just before the protocol driver 742 switches the card to another network. This message is received by the services running on other nodes, and indicates the state of the sending card. The service on the receiving nodes indicates this state to its driver 740, which then starts to buffer packets. The service 746 uses I/O Control Codes (ioctls) to interact with the intermediate driver 740. Query and set ioctls are implemented to expose the features of the service and for managing the behavior of the driver 740. It should be noted that the switching signals of the service 746 could be implemented in the driver as an NDIS timer. The switching signals are implemented in the service 746 to enable making switching decisions depending on the state of the other nodes as it is much easier to communicate and maintain network state at the user level than below the network layer. Further, it is much easier to manage the driver from the user level, than to modify the kernel and reinstall the software every time a parameter is changed. However, it is expected that better performance will be achieved if the functionality of most of the service 746 is moved down in the network stack to the intermediate driver 740.

The fixed priority, adaptive traffic, and adaptive buffer switching strategies show different behavior and each of them are useful for different scenarios. For the fixed switching strategy, the network with higher priority gets a larger time slot in which the wireless card remains active. Therefore, the network with a higher priority takes lesser time to complete a FTP transfer. The results of the adaptive strategy methods are similar. The adaptive buffer method adjusts the time it stays on a network based on the number of packets buffered for that network. Since the maximum throughput on an infrastructure network is more than the throughput of an ad hoc network, the number of packets buffered for the infrastructure network is more. Therefore, the FTP transfer completes faster over the infrastructure network as compared to a fixed strategy of 50% in an infrastructure network and 50% in an ad hoc network case. For a similar reason the FTP transfer over the infrastructure network completes faster when using the adaptive traffic strategy of switching. If more traffic is seen sent over the infrastructure network, the method proportionally gives more time to it. Overall, the adaptive strategies work by giving more time to faster networks if there is maximum activity over all the networks. However, if some networks are more active than the others, then the active networks get more time, and an inactive network gets much less time, if any. It is expected that these adaptive strategies will give the best performance if the user has no priority and wants to achieve the best performance over all the networks. However, if the user wants to prioritize his networks, fixed priority strategy is recommended.

Figure 8:
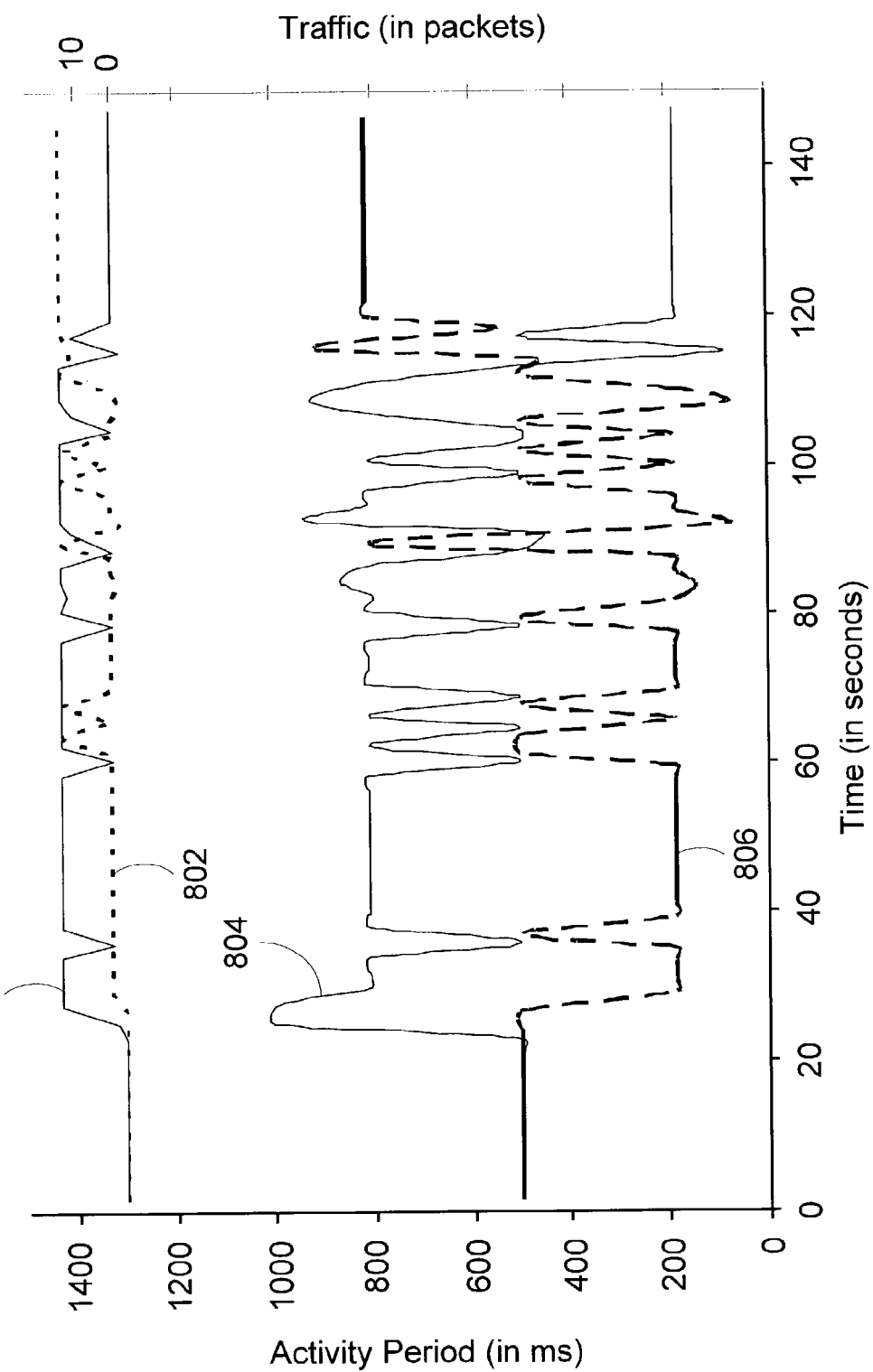
FIG. 8 is a schematic illustrating the correspondence between relative traffic on a network and activity periods in the network using an adaptive buffer switching strategy of the present invention.

The adaptability of the invention is demonstrated in FIG. 8. The adaptive buffer switching strategy is evaluated by running the invention for an ad hoc and an infrastructure network, for 150 seconds. The plots 800, 802 at the top of FIG. 8 show the traffic seen on both the wireless networks. Plot 800 is the traffic for the ad hoc network and plot 802 is the traffic for the infrastructure network. The plots 804, 806 show the corresponding effect on the activity period of each network. Plot 804 is the activity period for the ad hoc network and plot 806 is the activity period for the infrastructure network. As a result of the adaptive switching strategy, the activity period of the networks vary according to the traffic seen on them. Initially when there is no traffic on either network, equal time is given to both networks. After 20 seconds there is more traffic on the ad hoc network, and so more time is allocated to the ad hoc network. The traffic on the infrastructure network is greater than the traffic on the ad hoc network after around 110 seconds. Consequently, the infrastructure network is allocated more time. This correspondence between relative traffic on a network and its activity periods is evident in FIG. 8.

It should be noted that the adaptivity of the methods of the present invention reduces or eliminates the need for zero configuration services presently configured in operating systems such as the wireless zero configuration (WZC) presently configured in Windows XP®. The WZC is a service in Windows XP® that forces connectivity to the first available wireless network in a user's list of "Preferred Networks." The adaptive switching strategies require a user to specify a list of preferred networks, and the card connects to all the networks giving time to a network based on the amount of traffic on it. The current implementation of WZC can be modified to not force network connectivity or to force network connectivity among a plurality of 'Preferred Networks.' Alternatively, it is possible to treat the different virtual miniports as different wireless adapters to the user, and then allow WZC to have a preferred network for each virtual adapter.

It has been previously discussed that buffering over infrastructure networks can be achieved by using the IEEE 802.11 power saving mode. However, many wireless cards use proprietary software, which does not expose any API in Windows to programmatically set the resolution of power save mode for a wireless card. Therefore, the buffering algorithm previously described may not be implementable with these proprietary software wireless cards. This problem may be resolved by buffering packets at the end points of the infrastructure networks, using a similar scheme as described above for ad hoc networks. The service 746 keeps track of the end points of all on-going sessions, and buffers packets if the destination is currently in another network. For wide scale deployment, it is unreasonable to expect Internet servers, such as Yahoo or Amazon or the like, to do the buffering for nodes, and it is practical to implement the buffering algorithm at the access points as described above.

It should be noted that some packets destinations might not be on any of the networks to which the wireless card is connected. If the destination is not on any of the connected networks, a default gateway is chosen to send the packets. This is done even if the network with the gateway node is currently inactive. To send packets only on gateways of currently active networks, a flag is used to indicate when the network with the default gateway is active. This ensures that packets routable on the currently active network are not buffered.

The invention requires network dependent IP addresses for the different virtual adapters exposed by it. However, this may be a difficult constraint in existing operating systems. For example, an ad hoc network works in Windows® by assigning the node an autonet address. (i.e. 169.254.x.y address). In Windows XP®, a node is assigned an autonet address only if it is unable to get a proper DHCP (dynamic host configuration protocol.) address. This approach works fine if the network card stays in the ad hoc node for some time. However, the network card operating in accordance with the invention periodically switches between networks. If one of the networks is an infrastructure network, or a network with a DHCP server, the DHCP request gets through and the ad hoc node gets an IP address outside the range of autonet addresses. This can be fixed by manually allocating IP addresses for the virtual miniports. A better solution is to allow ad hoc nodes to get an autonet address without first attempting to get a routable DHCP address.

A key to the success of the invention is a short delay when switching across networks. However, commercially available wireless cards do not associate to more than one network at a time, and perform the entire 802.11 association procedure every time they switch to a network. We carried out a more detailed analysis of the steps when associating to an 802.11 network. There is a significant overhead when switching from one network to another network. The delay is on the order of 3 to 4 seconds from the time the card finishes associating to an ad hoc network, after switching from an infrastructure network, to the time it starts sending data. Our investigations revealed that the cause of this delay is the media disconnect and connect notifications to the IP stack. The IP stack damps the media disconnect and connect for a few seconds to protect itself and its clients from spurious 'media disconnects' and 'media connects.' The spurious connects and disconnects can be generated by network interface cards due to a variety of reasons ranging from buggy implementations of the card or switch firmware to the card/switch resetting itself to flush out old state. IP was designed to damp the media disconnect and connect notifications for some time before rechecking the connectivity state of the adapter and taking the action commensurate with that state.

In the case of the present invention, the switching between the networks is deliberate and meant to be hidden from higher protocols such as IP and its clients. We hide this switching by having the intermediate driver 740 trap the 'media disconnect' and 'media connect' messages when it switches between networks. Since the intermediate driver 740 is placed below IP, it can prevent the network layer from receiving the media disconnect and media connect messages. This results in a significant improvement in the switching overhead. An extra delay of 3 to 4 seconds when switching to an ad hoc network was reduced to approximately 100 milliseconds, which is attributed to the firmware of the wireless cards. Masking the 'media connect' and 'media disconnect' messages makes it no longer possible to accurately represent the active/passive state of the virtual adapters. As a result of the masking, all of the adapters are visible to the IP layer as active. It should be noted that the state of each miniport instance is however known to the intermediate driver 740.

The performance and deployment of the invention may be further improved. Good performance depends con low switching delays. It was previously discussed that the switching overhead can be reduced by an order of magnitude by trapping media disconnects. However, the switching delay is still in the order of hundreds of milliseconds, and this delay can be further reduced. The main cause of the switching overhead is the 802.11 protocol, which is executed every time a card switches to a network. The card believes that it has disassociated from the previous network and re-starts association. Furthermore, existing wireless cards do not store state for more than one network in the firmware, and wireless cards require a firmware reset when changing the mode from ad hoc to infrastructure and vice versa. Most of these problems can be fixed without breaking the IEEE 802.11 protocol. Since switching is forced by the invention, we recommend that the firmware and driver of wireless cards export the stored state for the currently associated network. With this, the protocol driver 742 only needs to context switch the card across various networks, by loading and saving state of a wire-less network. The only overhead on switching will then be synchronization with the current wireless network. This can be done reactively with the card requesting a synchronization beacon when it switches to a network.

With respect to security, the IEEE 802.1X is a centralized authentication protocol that is becoming increasingly popular for enterprise wireless LANs. The overhead of the IEEE 802.1X authentication protocol was measured and it was found to be approximately 600 ms. It is clear that the wireless card should be prevented from going through a complete authentication procedure every time it switches across IEEE 802.1X enabled networks. The authentication cycles are eliminated by storing the IEEE 802.1X state in the intermediate driver 740. The intermediate driver 740 uses this state instead of redoing the authentication procedure every time a switch is made. Furthermore, the IEEE 802.11 standard recommends an optimization called 'Preauthentication' for the access points. Preauthentication works by having the access points maintain a list of authenticated nodes. When implemented, this optimization will eliminate the authentication overhead every time the wireless card switches to an 802.1X enabled network.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A computer-readable storage medium having computer-executable instructions for performing a method to synchronize a wireless node having a single wireless card in a plurality of networks having a plurality of wireless nodes, each of the plurality of wireless nodes having an activity time period, an elapsed time inside an activity time period and a switching cycle, the method comprising:
   determining which node of the plurality of wireless nodes in at least one ad hoc network in the plurality of networks is a network leader, each network leader having an activity time period and an elapsed time in the at least one ad hoc network in which the node is a network leader, wherein determining includes
      remaining on the at least one ad hoc network for at least two switching cycles;
      if an announcement is received from another node, determining if the announcement of the other node indicates that the other node is a leader in the at least one ad hoc network;
      if the announcement of the other node indicates the other node is the leader, designating the other node as a leader; and
      if the announcement from the other node indicates the other node is not a leader, announcing an activity period and an elapsed time of the wireless node;
   synchronizing the activity period and elapsed time of the wireless node with the activity period and elapsed time of each network leader for the at least one ad hoc network;
   resynchronizing the wireless node to a new leader or becoming a new leader if the wireless node has not received an announcement from the leader for at least two switching cycles; and
   switching between the plurality of networks using a switching strategy.

2. The computer readable storage medium of claim 1 wherein at least one of the plurality of networks requires an authentication protocol be used, the method further comprising the step of storing authentication state for subsequent connections to the at least one of the plurality of networks to reduce the number of authentications from being performed.

3. The computer readable storage medium of claim 1 further comprising the step of trapping media disconnect and media connect messages when switching between the plurality of networks.

4. The computer readable storage medium of claim 1 further comprising the step of maintaining state of other wireless nodes in each ad hoc network in the plurality of networks.

5. The computer readable storage medium of claim 4 wherein the state is maintained in a state table, the computer readable medium having further computer executable instructions for performing the steps comprising:
   checking the state table when a packet is to be sent to a destination node to determine if the destination node is currently associated with the current network in which the wireless node is associated;
   sending the packet to the destination node if the destination node is currently associated with the current network; and
   buffering the packet if the destination node is currently associated with another network.

6. The computer readable storage medium of claim 5 further comprising the step of sending buffered packets destined for the destination node on the current network after the state table indicates that the destination node has switched to the current network.

7. The computer readable storage medium of claim 4 wherein the step of maintaining state of other wireless nodes in each ad hoc network in the plurality of networks comprises maintaining state for directly reachable wireless nodes in each ad hoc network.

8. The computer readable storage medium of claim 1 wherein the at least one ad hoc network comprises a plurality of ad hoc networks and the step of synchronizing the activity period and elapsed time of the wireless node with the activity period and elapsed time of each network leader includes the steps of:
   determining if there is an overlap of activity periods of at least two network leaders in the plurality of ad hoc networks;
   if the at least two network leaders have overlapping activity periods:
      synchronizing the activity period of the wireless node with one of the at least two network leaders based on a priority of the wireless node; and
      remaining on the network where the other of the at least two network leaders is a network leader for a part of a duration of the activity period of the other of the at least two network leaders.

9. The computer readable storage medium of claim 8 having further computer executable instructions for performing the step comprising not sending any announcement messages in the network where the other of the at least two network leaders is a network leader.

10. A method for a wireless node to switch between a plurality of networks using a single wireless card comprising the steps of:
   switching between the plurality of networks in accordance with a switching strategy; and
   if the plurality of networks has at least one ad hoc network:
      determining a network leader in the at least one ad hoc network, wherein determining includes
         remaining on the at least one ad hoc network for at least two switching cycles;

if an announcement is received from another node, determining if the announcement of the other node indicates that the other node is a leader in the at least one ad hoc network;

if the announcement of the other node indicates the other node is the leader, designating the other node as a leader; and if the announcement from the other node indicates the other node is not a leader, announcing an activity period and an elapsed time of the wireless node; and adjusting the switching strategy based on an activity time period and an elapsed time period of the network leader of the at least one ad hoc network, wherein the step of switching between the plurality of networks comprises switching between the networks based on an amount of traffic seen in each of the plurality of networks over a period of time.

11. The method of claim 10 wherein the step of switching between the plurality of networks comprises switching between the networks in accordance with an allocated activity period for each network.

12. The method of claim 11 wherein the allocated activity period for each network is allocated by a user.

13. The method of claim 10 wherein the step of switching between the plurality of networks comprises switching between the networks based on a number of packets buffered by the wireless node.

14. The method of claim 10 wherein the step of switching between the plurality of networks in accordance with a switching strategy includes the step of broadcasting a message before the wireless node switches between one of the plurality of networks to an other of the plurality of networks, the message indicating the wireless node is switching from the one of the plurality of networks.

15. The method of claim 14 further comprising the step of buffering packets for the other wireless node if a broadcast message is received from the other wireless node indicating that the other wireless node is leaving the network in which the wireless node is active.

16. The method of claim 10 further comprising the step of trapping at least one of media disconnect messages and media connect messages when switching between the plurality of networks.

17. The method of claim 10 further comprising the step of selecting a default gateway in one of the plurality of networks to send a message if a destination of the message is not on any of the plurality of networks.

18. The method of claim 17 further comprising the step setting a flag to indicate when the one of the plurality of networks with the default gateway is active.

* * * * *